Patented Sept. 23, 1924.

1,509,413

UNITED STATES PATENT OFFICE.

DON W. BISSELL AND ROBERT B. McCANN, OF BUFFALO, NEW YORK, ASSIGNORS TO NATIONAL ANILINE & CHEMICAL COMPANY, INC., OF NEW YORK, N. Y., A CORPORATION OF NEW YORK.

TRIPHENYLMETHANE COMPOUND AND METHOD OF PRODUCING SAME.

No Drawing.  Application filed November 29, 1920. Serial No. 427,127.

*To all whom it may concern:*

Be it known that we, DON W. BISSELL and ROBERT B. McCANN, citizens of the United States, and residents of Buffalo, in the county of Erie and State of New York, have invented certain new and useful Improvements in Triphenylmethane Compound and Methods of Producing Same; and we do hereby declare the following to be a full, clear, and exact description of the invention, such as will enable others skilled in the art to which it appertains to make and use the same.

This invention relates to an improved method of condensing meta-hydroxybenzaldehyde with diethylanilin, and sulfonating the condensation product thus produced, with the resulting production of a new disulfonic acid of 3-hydroxy-4′.4″-tetraethyldiaminotriphenylmethane. The new sulfonic acid, as well as the improvements in the method of its production, forms a part of the invention.

The invention will be further illustrated by the following specific examples:

*Condensation of meta-hydroxybenzaldehyde with diethylanilin.*

Example 1: 120 pounds of 66° Bé. sulfuric acid are slowly added to 348 pounds of diethylanilin, with agitation in a cast iron kettle, and the contents being kept cool so that the temperature does not rise above 60° C. When all of the acid is added and the temperature of the mixture begins to fall, 135 pounds of pure dry meta-hydroxybenzaldehyde are added, care being taken that the agitation continues and that the temperature does not rise above 100° C. The mixture is then heated, with continued agitation, for 24 hours at a temperature of 100 to 105° C., for 24 hours at 105 to 110° C., and then for 24 hours at 115 to 120° C., the total time of heating being about 72 hours. The contents of the kettle, without cooling, are then dumped into a large iron pan, allowed to cool, and then broken up into lumps and ground to a coarse powder. The condensation product, namely, the 3-hydroxy-4′. 4″-tetraethyldiaminotriphenylmethane, is thus obtained in the form of its sulfate, and this sulfate, without conversion into the free base, is utilized directly for the sulfonation.

The use of an excess of diethylanilin over and above that required for the condensation has the advantage of keeping the product more fluid and of lessening the danger of charring.

It has been found possible to use less sulfuric acid than is used in the above example, provided the condensation be allowed to cover a longer period of time, and this smaller amount of acid has the advantage of leaving the product still more fluid, especially at the end of the operation, at which time it is then more easily handled. This use of a smaller amount of acid is illustrated by the following example:

Example 2: 413 pounds of diethylanilin are charged into a jacketed kettle provided with an agitator, 81 pounds of 66° Bé. sulfuric acid are then added, and the mixture agitated for about 2 hours. 155 pounds of meta-hydroxylbenzaldehyde are then added while the temperature is kept below 60° C. and the charge is agitated at such temperature for 1 hour. It is then heated to 100 to 105° C. and kept at that temperature for 24 hours; it is next kept at 110° C. for 48 hours; and it is finally maintained at 115° C. for 48 hours. The charge is then dumped into pans, the pans covered to keep out moisture, and the product allowed to cool.

In the sulfonation of 3-hydroxy-4′.4″-tetraethyldiaminotriphenylmethane it has heretofore been proposed to isolate and purify the free base. This isolation and purification, however, is attended with considerable difficulty. We have found that the isolation and purification of the free base is not necessary, and that the crude sulfate, produced as above described, can with advantage be used directly for the subsequent sulfonation, thereby avoiding the additional steps necessary in freeing and purifying the base and subsequently dissolving it, while at the same time taking advantage of the sulfuric acid remaining from the condensation. The crude condensation product, when cold, is brittle, easily powdered, does not require drying, and is easily soluble in the oleum used for its sulfonation.

In carrying out the sulfonation, we have found it of advantage to add oleum in successive portions, instead of all at once. The first portion acts as a solvent, to dissolve the sulfate of the 3-hydroxy-4′.4″-tetraethyldiaminotriphenylmethane, while it also effects considerable sulfonation, and it enables proper conditions to be readily obtained for completion of the sulfonation upon the subsequent addition of the rest of the oleum. By proceeding in this way the concentration of sulfur trioxide is kept down. The sulfonation process will be further illustrated by the following specific example:

*Sulfonation of 3-hydroxy-4'.4"-tetraethyl-diaminotriphenylmethane.*

Example 3: In a water jacketed cast iron kettle, fitted with an agitator, 73 pounds of 66° Bé. sulfuric acid are mixed with 161.5 pounds of 26% oleum, and the mixture is cooled to 25° C. To this mixture there is slowly added 100 pounds of the powdered crude product obtained according to example 1 above, by the condensation of meta-hydroxybenzaldehyde with diethylanilin, care being taken that the temperature does not rise above 30° C. After all of the condensation product is added, 95 pounds more of the 26% oleum is run in while keeping the temperature below 30° C., and the agitation is continued for 48 hours at a temperature of from 23 to 27° C. The sulfonation mixture is then added to 1000 pounds of water in a lead-lined kettle fitted with an agitator, the mixture being added to the agitated water in a steady stream, while the temperature rises to about 60 to 65° C. The resulting solution is then stirred for 24 hours during which time it cools to room temperature and the disulfonic acid of the base separates out as a hydrate in fine white to grayish-white crystals. 500 pounds more of water are added, the mixture thoroughly agitated, and then filtered through a filter press, the crystalline precipitate being washed in the press with 200 pounds of water and air being then forced through it for a few minutes. The crystalline product is then taken from the press and put back into the lead-lined kettle and agitated again with 500 pounds of water, filtered, washed with 200 pounds of water, and air blown through it until the precipitate is fairly dry.

The specific details of the process can be somewhat varied. Thus, where larger amounts of material are treated, the oleum may be added in more than two successive portions, and the condensation product to be sulfonated can likewise be added in successive portions. The following example further illustrates the invention:

Example 4: 108 pounds of 66° Bé. sulfuric acid are charged into a jacketed kettle provided with an agitator and 36½ pounds of the condensation product, produced according to example 2 above, are then added slowly with cooling, while keeping the temperature below 30° C. 60 pounds of 26% oleum are then added, then 36½ pounds of the condensation product, and again 60 pounds of oleum, and so on, until all the condensation product, amounting to about 290 pounds, is added. Finally the remainder of the oleum, sufficient to bring the total up to about 640 pounds, is run in and the temperature is maintained at 25° C. for 48 hours. The product is then transferred to a lead-lined vat containing 3000 pounds of water and allowed to crystallize for 24 hours. 1500 pounds more of water are then added and the charge is filtered in a filter press and washed in the press with water until most of the acid is removed, after which air is forced through the press for about 20 minutes. The leuco disulfonic acid is thus obtained as a press-cake containing sufficient water to form about a 70% paste. This product can be further dried, or it can be directly used for the production of a dyestuff, by subjecting it to oxidation.

The product obtained according to examples 3 and 4 is, when pure, white and crystalline, only slightly soluble in water and dilute acids, but readily soluble in alkali solutions with the formation of a soluble salt. It requires approximately 2 equivalents of caustic soda to dissolve it, thus indicating that it is a dibasic acid, while its sulfur content has been found to correspond to that of the disulfonic acid. When first produced, it contains water of crystallization, a part or all of which it slowly loses by efflorescence at ordinary temperatures. It easily gives off all of its water without melting at about 70° C. and forms a very fine powder which easily passes back into the hydrated crystal form when treated with water. The anhydrous product, as well as the hydrated product, is only slightly soluble in water. The anhydrous form melts at about 282 to 282.5° C.

This product we consider to be a new product, and we accordingly claim it as a part of the invention.

We claim:

1. The method of effecting the preparation and sulfonation of 3-hydroxy-4'.4"-tetraethyldiaminotriphenylmethane, which comprises subjecting meta-hydroxybenzaldehyde and diethylanilin to condensation with sulfuric acid, and subjecting the resulting condensation product, without isolation of the free base and without separation from the sulfuric acid, to sulfonation.

2. The method of effecting the preparation and sulfonation of 3-hydroxy-4'.4"-tetraethyldiaminotriphenylmethane, which comprises subjecting meta-hydroxybenzaldehyde and diethylanilin to condensation with sulfuric acid, cooling and pulverizing the resulting product and subjecting it directly to sulfonation with oleum, whereby the 3-hydroxy-4'.4" - tetraethyldiaminotriphenylmethane is obtained in the form of its sulfonic acid without intermediate isolation of the free base.

3. The method of sulfonating 3-hydroxy-4′.4″ - tetraethyldiaminotriphenylmethane, which comprises subjecting the sulfate of 3 - hydroxy - 4′.4″ - tetraethyldiaminotriphenylmethane to sulfonation with oleum.

4. The method of sulfonating 3-hydroxy-4′.4″ - tetraethyldiaminotriphenylmethane with oleum, which comprises adding the oleum in successive portions while maintaining the temperature below about 30° C.

5. The method of isolating the sulfonic acid of 3-hydroxy-4′.4″-tetraethyldiaminotriphenylmethane from the product of the sulfonation, which comprises mixing the sulfonation product with a large amount of water and separating the sulfonic acid in a crystalline state by cooling.

6. The method of preparing a sulfonic acid derivative of 3-hydroxy-4′.4″-tetraethyldiaminotriphenylmethane, which comprises subjecting the reaction product, resulting from the condensation of meta-hydroxy-benzaldehyde and diethylanilin by means of sulfuric acid, directly and without isolation of individual products of reaction to sulfonation, the sulfonation being effected by admixing the reaction product in successive portions and in alternation with successive amounts of the sulfuric acid.

7. As a new product a sulfonic acid of 3 - hydroxy - 4′.4″ - tetraethyldiaminotriphenylmethane, said product, when freshly prepared, being a white crystalline solid containing water of crystallization, but readily giving off its water of crystallization without melting when heated and forming a fine powder, said product being only slightly soluble in water and dilute acids, but dissolving easily in alkali solutions and requiring approximately two equivalents of caustic soda for its solution.

8. The method of preparing 3-hydroxy-4′.4″ - tetraethyldiaminotriphenylmethane disulfonic acid, which comprises subjecting 3 - hydroxy - 4′.4″ - tetraethyldiaminotriphenylmethane, as sulfate, to sulfonation with oleum, adding the resulting sulfonation mixture to water and crystallizing therefrom the 3 - hydroxy - 4′.4″ - tetraethyldiaminotriphenylmethane disulfonic acid, and subsequently removing the crystalline precipitate by filtration.

9. In the method of preparing 3-hydroxy-4′.4″ - tetraethyldiaminotriphenylmethane disulfonic acid by sulfonation of 3-hydroxy-4′.4″ - tetraethyldiaminotriphenylmethane, the step which comprises the crystallization of 3-hydroxy-4′.4″-tetramethyldiaminotriphenylmethane disulfonic from an aqueous solution of the resulting sulfonation admixture.

In testimony whereof we affix our signatures.

DON W. BISSELL.
ROBERT B. McCANN.